3,383,195
m-(3,3-DIMETHYLUREIDO)PHENYL DIMETHYL-
SULFAMATE AS A HERBICIDE
Paul E. Drummond and Kenneth L. Hill, Middleport,
and Kenneth R. Wilson, Tonawanda, N.Y., assignors
to FMC Corporation, New York, N.Y., a corporation
of Delaware
No Drawing. Filed Dec. 22, 1964, Ser. No. 420,451
4 Claims. (Cl. 71—103)

ABSTRACT OF THE DISCLOSURE

Herbicidal compositions containing as an active ingredient m - (3,3 - dimethylureido)phenyl dimethylsulfamate. Synthesis of the new compound and herbicidal effectiveness against a variety of plants are described.

This invention relates to a novel herbicidal compound, to new herbicidal compositions, and to new methods for the control of undesired plant growth, both pre-emergently and post-emergently, by application of said new and useful herbicidal compositions.

The new and useful compound of this invention is the compound m-(3,3-dimethylureido)phenyl dimethylsulfamate, of the formula:

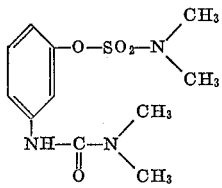

This compound, when formulated as an essential active ingredient of herbicidal compositions, and applied pre-emergently or post-emergently, exhibits excellent herbicidal properties.

m-(3,3-dimethylureido)phenyl dimethylsulfamate may be prepared from m-aminophenol by reaction of the amino and the hydroxyl functional groups with the appropriate reagents to produce sulfamates and urea derivatives. For example, a dimethylsulfamoyl halide may be reacted with the intermediate 3-(m-hydroxyphenyl)-1,1-dimethylurea, which in turn may be prepared by the reaction of a dimethylcarbamoyl halide with m-aminophenol. Procedures adaptable to the preparation of this sulfamic acid ester are described in R. Wegler and H. Kukenthal in U.S. Patent No. 2,839,562, and the urea derivative may be prepared employing the procedures for the preparation of amides from acyl halides as described by L. C. Raiford and K. Alexander, J. Org. Chem. 5, 300–12 (1940).

The preparation of m-(3,3-dimethylureido)phenyl dimethylsulfamate is illustrated below. All temperatures are expressed in degrees centigrade.

Example 1.—Synthesis

The intermediate 3-(m-hydroxyphenyl)-1,1-dimethylurea was prepared as follows: A solution of 22.9 g. of m-aminophenol and 11.8 g. of dimethylcarbamoyl chloride in 200 ml. of 1,2-dimethoxyethane was allowed to stand at room temperature for three days. The reaction mixture was concentrated to dryness under vacuum, and the residual oil mixed with water. The tarry solid which separated was washed with water and dried to yield 15.5 g. of crude product melting at 198–200°. Recrystallization from ethanol gave 12.0 g. of 3-(m-hydroxyphenyl)-1,1-dimethylurea melting at 200–1°.

This phenol was converted to the sodium salt as follows: A suspension of 18.0 g. of 3-(m-hydroxyphenyl)-1,1-dimethylurea in 50 ml. of methanol was added to a solution of 5.4 g. of sodium methoxide in 75 ml. of methanol. The methanol was removed under vacuum and the residual solid was washed twice with benzene, and dried over phosphorus pentoxide at a pressure of 0.2 mm. This sodium salt of 3-(m-hydroxyphenyl)-1,1-dimethylurea had a melting point above 315°.

This product was reacted with dimethylsulfamoyl chloride as follows: Dimethylsulfamoyl chloride (14.3 g.) was added dropwise to a stirred suspension of 20.2 g. of the sodium salt of 3-(m-hydroxyphenyl)-1,1-dimethylurea in 100 ml. of 1,2-dimethoxyethane. The mixture was stirred and refluxed for three hours, then cooled and filtered to remove the sodium chloride. The filtrate was concentrated to dryness under vacuum to yield 25.0 g. of crude product, melting at 114–9°. On recrystallization from ethanol, 18.5 g. of m-(3,3-dimethylureido)phenyl dimethylsulfamate, melting at 120–3°, was obtained. An analytical sample, recrystallized twice from ethanol, melted at 124–5°.

*Analysis.*—Calc'd for $C_{11}H_{17}N_3O_4S$: C, 45.98; H, 5.96; N, 14.62; S, 11.16. Found: C, 46.26; H, 5.97; N, 14.35; S, 11.21.

For herbicidal applications, the active ingredient of this invention may be utilized in diverse formulations, including the adjuvants and carriers normally employed for facilitating the dispersion of active ingredients for agricultural applications, recognizing the fact that the formulation and mode of application of a toxicant may affect the activity of the material in a given application. Thus, m-(3,3-dimethylureido)phenyl dimethylsulfamate may be formulated as a granule of relatively large particle size, as a powdery dust, as a wettable powder, as an emulsifiable concentrate, as a solution, or as any of several other known types of formulations, depending on the desired mode of application. For pre-emergence application these herbicidal compositions are usually applied either as sprays, dusts or granules in the area in which suppression of vegetation is desired. For post-emergence control of established plant growth, sprays or dusts are most commonly used. These formulations may contain as little as 0.5% or as much as 95% or more by weight of active ingredient.

Dusts are admixtures of the active ingredient with finely divided solids such as talc, attapulgite clay, kieselguhr, and other organic and inorganic solids which act as dispersants and carriers for the toxicant; these finely divided solids have an average particle size of less than about 50 microns. A typical dust formulation, useful herein, is one containing 1.0 part of m-(3,3-dimethylureido)-phenyl dimethylsulfamate and 99.0 parts of talc.

Wettable powders, also useful formulations for both pre- and post-emergence herbicides, are in the form of finely divided particles which disperse readily in water or other dispersant. The wettable powder is ultimately applied to the soil either as a dry dust or as an emulsion in water or other liquid. Typical carriers for wettable powders include fuller's earth, kaolin clays, silicas, and other highly absorbent, readily wet inorganic diluents. Wettable powders normally are prepared to contain about 5–80% of active ingredient, depending on the absorbency of the carrier, and usually also contain a small amount of a wetting, dispersing or emulsifying agent to facilitate dispersion. For example, a useful wettable powder formulation contains 80.8 parts of m-(3,3-dimethylureido)phenyl dimethylsulfamate, 17.9 parts of Palmetto clay and 1.0 part of sodium lignosulfonate and 0.3 part of sulfonated aliphatic polyester as wetting agents.

Other useful formulations for herbicidal applications are the emulsifiable concentrates, which are homogeneous liquid or paste compositions which are dispersible in water or other dispersant, and may consist entirely of m-(3,3- dimethylureido)phenyl dimethylsulfamate with a liquid or solid emulsifying agent, or may also contain a liquid carrier, such as xylene, heavy aromatic naphthas, isophorone and other non-volatile organic solvents. For herbicidal application these concentrates are dispersed in water or other liquid carrier, and normally applied as a spray to the area to be treated. The percentage by weight of the essential active ingredient may vary according to the manner in which the composition is to be applied, but in general comprists 0.5 to 95% of active ingredient by weight of the herbicidal composition.

Typical wetting, dispersing or emulsifying agents used in agricultural formulations include, for example, the alkyl and alkylaryl sulfonates and sulfates and their sodium salts; polyethylene oxides; sulfonated oils; fatty acid esters of polyhydric alcohols; and other types of surface active agents, many of which are available in commerce. The surface active agent, when used, normally comprises from 1% to 15% by weight of the herbicical composition.

Other useful formulations for herbicidal applications include simple solutions of the active ingredient in a dispersant in which it is completely soluble at the desired concentration, such as acetone or other organic solvents. Granular formulations, wherein the toxicant is carried on relatively coarse particles, are of particular utility for aerial distribution or for penetration of cover crop canopy. Pressurized sprays, typically aerosols wherein the active ingredient is dispersed in finely divided form as a result of vaporization of a low boiling dispersant solvent carrier such as the Freons, may also be used.

The formulation and application of the herbicide of this invention is illustrated further in the following examples:

Example 2.—Pre-emergence application

The pre-emergence herbicidal activity of m-(3,3-dimethylureido)phenyl dimethylsulfamate was demonstrated as follows: In flat pans was placed, to a depth of three inches, a 1:1 mixture of silt loam and sandy loam soil. In the soil were planted seeds of lima bean and corn at a depth of approximately one inch, and seeds of mustard, lettuce and crabgrass at a depth of one-fourth to one-half inch. These plant species are representative of a broad spectrum of plant species. As soon as the weeds were planted and the flats watered, the toxicant was sprayed on the soil as an acetone-water solution, at a rate equivalent to eight pounds of toxicant per acre. Both the treated flats and an untreated control were held in the greenhouse for two weeks, after which time the performance of the toxicant was assessed in terms of percent kill with respect to the untreated control. Results are presented in Table 1 below:

TABLE 1.—PRE-EMERGENCE HERBICIDAL ACTIVITY

| Test plant species: | Percent kill |
|---|---|
| Lima bean | [1] 80 |
| Corn | [2] 0 |
| Mustard | 100 |
| Lettuce | 100 |
| Crabgrass | [1] 90 |

[1] Surviving plants injured and will probably die.
[2] Plants injured but will probably recover.

The above results indicate effective pre-emergence activity, as well as selectivity, of the subject herbicide.

Example 3.—Post-emergence application

The post-emergence herbicidal activity of m-(3,3-dimethylureido)phenyl dimethylsulfamate was demonstrated as follows: In flat pans was placed, to a depth of three inches, a 1:1 mixture of silt loam and sandy loam soil. In the soil were then planted seeds of lima bean and corn at a depth of approximately one inch, and seeds of mustard, lettuce and crabgrass at a depth of one-fourth to one-half inch; these plant species are representative of a broad spectrum of plant species. The flats were watered, and the seeds allowed to grow in the greenhouse for two weeks. Maintaining an untreated control, the stand of plants was then sprayed with a solution of m-(3,3-dimethylureido)phenyl dimethylsulfamate in aqueous acetone, at a rate equivalent to eight pounds of toxicant per acre. Both treated and untreated plants were held in the greenhouse for two to three weeks, after which the number of surviving plants were counted, and the percent kill with respect to the untreated control was estimated. Results are presented in Table 2 below:

TABLE 2.—POST-EMERGENCE HERBICIDAL ACTIVITY

| Test plant species: | Percent kill |
|---|---|
| Lima bean | 100 |
| Corn | 0 |
| Mustard | 100 |
| Lettuce | 100 |
| Crabgrass | [1] 50 |

[1] Plants injured and will probably die.

This herbicide in post-emergence applications shows an unusual activity in the control of plant growth, and significant selectivity.

The active herbicidal compounds of this invention may be formulated and/or applied with insecticides, fungicides, nematocides, plant growth regulators, fertilizers, and other agricultural chemicals, and as an effective soil sterilant as well as an herbicide. In applying the active compound of this invention, whether formulated alone or with other agricultural chemicals, an effective amount and concentration of m-(3,3-dimethylureido)phenyl dimethylsulfamate is of course employed.

It is apparent that various modifications may be made in the formulation and application of the novel compound of this invention, without departing from the inventive concept herein, as defined in the following claims.

We claim:
1. Herbicidal composition comprising as an essential active ingredient 0.5 to 95% by weight of m-(3,3-dimethylureido)phenyl dimethylsulfamate, and an inert carrier in admixture therewith.
2. Method of controlling undesired plant growth which comprises applying an herbicidal amount of m-(3,3-dimethylureido)phenyl dimethylsulfamate to the locus of the undesired plant growth.
3. Method of controlling undesired plant growth prior to emergence of said growth which comprises applying an herbicidal amount of m-(3,3-dimethylureido)phenyl dimethylsulfamate to the locus wherein control of undesired plant growth is to be effected.
4. Method of controlling undesired plant growth after emergence of said growth from the soil which comprises applying an herbicidal amount of m-(3,3-dimethylureido)-phenyl dimethylsulfamate to the locus of said undesired plant growth.

References Cited

UNITED STATES PATENTS

| 2,795,610 | 6/1957 | Gerjovich | 71—2.6 X |
| 2,839,562 | 6/1958 | Wegler et al. | 260—456 |
| 3,082,238 | 3/1963 | Dunbar | 71—2.6 X |

LEWIS GOTTS, *Primary Examiner.*

JAMES O. THOMAS, JR., *Examiner.*

G. HALLRAH, *Assistant Examiner.*